May 26, 1959  E. C. CHAMBERS  2,887,814
FISH LINE RETRIEVING APPARATUS
Filed Nov. 30, 1956
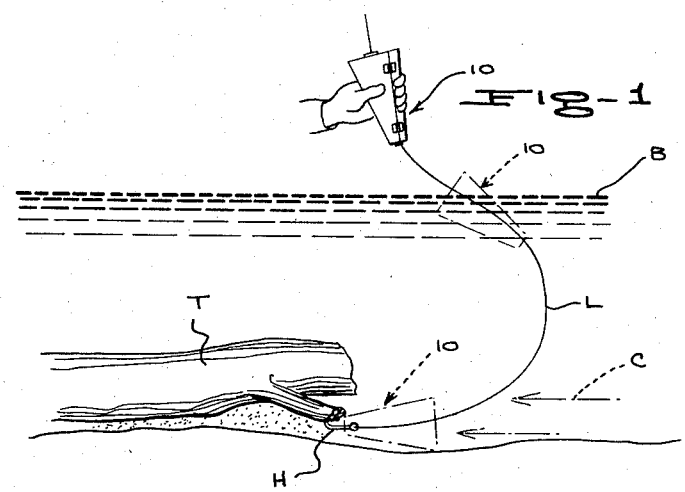
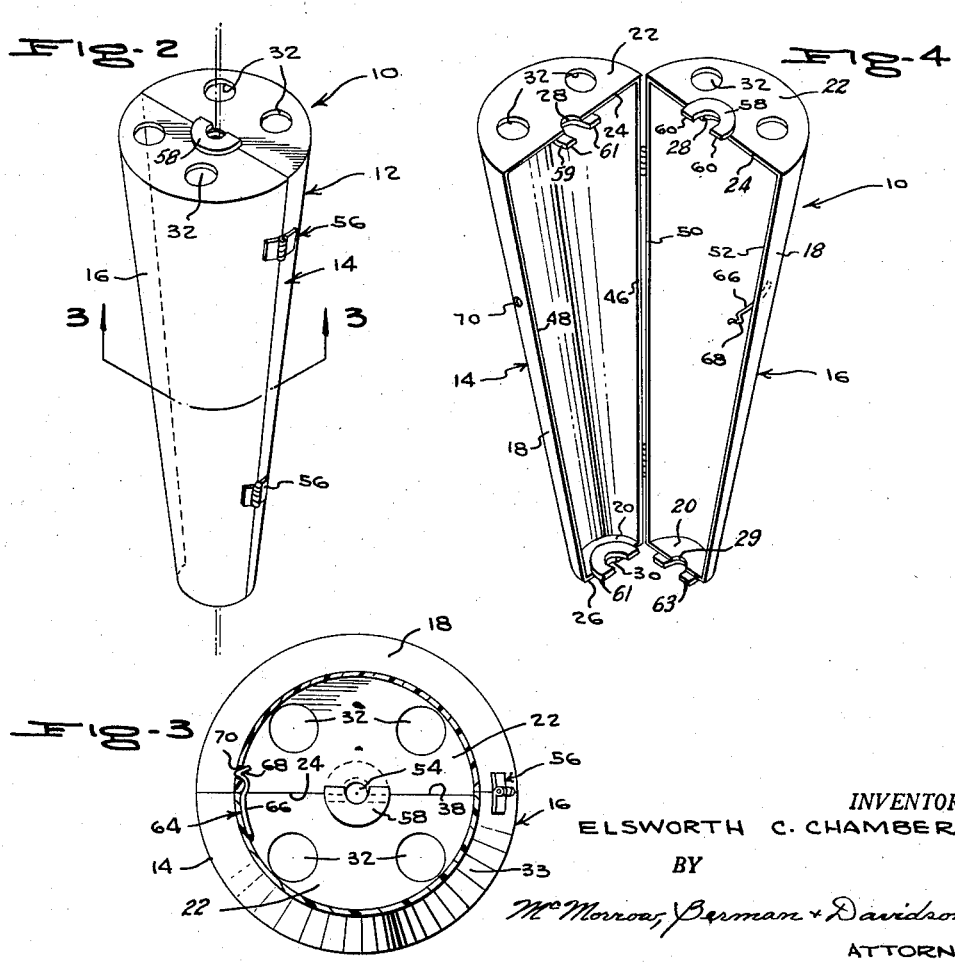
INVENTOR.
ELSWORTH C. CHAMBERS
BY
ATTORNEYS

2,887,814

FISH LINE RETRIEVING APPARATUS

Elsworth C. Chambers, Douglas, Wyo.

Application November 30, 1956, Serial No. 625,424

5 Claims. (Cl. 43—17.2)

This invention relates to an improved fishhook retriever for freeing hooks and lures snagged below the surface of a body of water.

The primary object of the invention is to provide a more practical and efficient retriever of this kind which is composed of a pair of similar hollow sections having end walls provided with mating notches which form fishing line engaging openings on the axis of the retriever when the sections are closed, the retriever being of relatively large cross-section and relatively great length so that these dimensions cooperate with the hollow character of the retriever to condition the retriever to be readily moved by currents in a body of water in which the retriever is used, in a manner to assist in or to produce unsnagging of a hook or lure on a fishing line on which the retriever is used.

Another object of the invention is to provide a retriever of the character indicated, which can be made in well-finished, rugged, and serviceable forms at relatively low cost, is easily used, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a schematic view showing a retriever of the present invention in use on a fishing line for retrieving a hook snagged in a body of water;

Figure 2 is a top perspective view of the retriever;

Figure 3 is an enlarged horizontal section taken substantially on the plane of line 3—3 of Figure 2; and Figure 4 is a perspective view of the retriever showing the same in an open position.

Referring to the drawings in detail, there is shown a body of water W having on its bottom a tree trunk T which has snagged therein a hook H on a fishing line L. Indicated generally at 10 is a retriever of the invention which comprises an elongated downwardly tapering hollow shell 12 composed of a pair of complementary similar sections, indicated generally at 14 and 16.

The sections 14 and 16 have semi-circular tapering side walls 18 and are closed at their lower ends by semi-circular bottom walls 20 and are closed at their upper ends by semi-circular top walls 22. Included in the diametrical edges 24 of the top walls 22 and in the diametrical edges 26 of the bottom walls 20 are axial notches 28 and 29, respectively. The top walls 22 have therein a pair of relatively large holes 30 for permitting the passage of water into the shell 12 when the retriever is in use.

The section 14 has side edges 46 and 48 which are complementary to the side edges 50 and 52 of the section 16. The diametrical edges 24 of the top walls 22 are complementary edges, as are the diametrical edges 26 of the bottom walls 20, so that the notches 28 are complementary, as are the notches 29 of the top and bottom walls of the sections, and define axially aligned apertures in the top and bottom walls when the sections are closed together.

Hinge assemblies, indicated generally at 56, connect related side edges of the sections together. In order to lend rigidity to the shell 12, which is constructed of plastic or from sheet metal, suitably secured on the upper surface of a top wall 22 is an arcuate reinforcement 58 having projecting end portions 60 extending beyond the diametrical edge 24 thereof. The reinforcement 58 incorporates a U-shaped notch 62 aligned with the notch 28. Suitably secured on the under surface of the top wall 22 of the other section is a similar reinforcement 59, having end portions 61 which project beyond the diametrical edge 24 and engage under the end portions 60 when the sections are closed, as shown in Figure 2. Disposed in similar relationship on the bottom walls 20 of the sections 14 and 16 are similar reinforcements 61 and 63, which cooperate in the manner above described.

For the purpose of securing the sections together in the closed relation shown in Figure 2, a latch assembly, indicated generally at 64, is provided, which comprises a resilient arm 66 suitably secured at one end on an intermediate portion of the side wall 18 of the section 16 and extending beyond the side edge 52 thereof, and having an intermediate offset portion 68 adapted to be securably engaged through an opening 70 provided in the side wall 18 of the section 14.

When a fishing line L has its hook H snagged as shown in Figure 1, the shell 12 is opened as shown in Figure 4 and the sections then closed with the fishing line L in the notches of the section end walls. The retriever is then released to descend along the line L into the body of water W to engage the hook H. If this rapid gravitation of the shell 12 is insufficient to dislodge the hook H, a current in the body of water, as indicated by the arrow C, can act against the retriever and dislodge the hook H and enable the hook and the fishing line L to be retrieved.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A fishing line retriever comprising an elongated longitudinally divided hollow shell composed of two similar sections, means hinging the sections together to swing between open and closed positions relative to each other, each section consisting of an imperforate side wall and first and second flat end walls at the ends of the side wall, the first end walls being devoid of water passing opening means and the second end walls having water passing opening means therein, the first end walls having facing edges and the second end walls having facing edges, central notches in the facing edges of the first and second end walls defining fishing line passing apertures while the sections are in closed relation, said water passing opening means being located between the notches and the side walls of the sections, and means for releasably maintaining the sections in closed relation.

2. A fishing line retriever comprising an elongated longitudinally divided hollow shell composed of two similar sections, means hinging the sections together to swing between open and closed positions relative to each other, each section consisting of an imperforate side wall and first and second flat end walls at the ends of the side wall, the first end walls being devoid of water passing opening means and the second end walls having water passing opening means therein, the first end walls having facing edges and the second end walls having facing edges, central notches in the facing edges of the first and second end walls defining fishing line passing apertures while the sections are in closed relation, means for releasably maintaining the sections in closed relation, and reinforcing elements fixed on the facing edges of the end walls, said reinforcing elements having projecting portions located at sides of said notches and extending radially inwardly beyond related facing edges, the projecting portions of the reinforcing elements on related end walls being in different planes to overlap each other when the sections are closed.

3. A fishing line retriever comprising an elongated longitudinally divided hollow shell composed of two similar sections, means hinging the sections together to swing between open and closed positions relative to each other, each section consisting of an imperforate side wall and first and second flat end walls at the ends of the side wall, the first end walls being devoid of water passing opening means and the second end walls having water passing opening means therein, the first end walls having facing edges and the second end walls having facing edges, central notches in the facing edges of the first and second end walls defining fishing line passing apertures while the sections are in closed relation, means for releasably maintaining the sections in closed relation, and reinforcing elements fixed on the facing edges of the end walls, said reinforcing elements having projecting portions located at sides of said notches and extending radially inwardly beyond related facing edges, the projecting portions of the reinforcing elements on related end walls being in different planes to overlap each other when the sections are closed, the reinforcing elements being on opposite sides of related end walls.

4. A fishing line retriever consisting of an elongated hollow shell having a side wall and first and second flat end walls, said side wall being imperforate and being tapered from said second end wall to said first end wall, said second end wall being provided with water passing openings therein and said first end wall being devoid of water passing openings, said first and second end walls being provided with central fishing line passing openings.

5. A fishing line retriever according to claim 2, wherein said reinforcing elements surround related ones of said notches.

References Cited in the file of this patent

UNITED STATES PATENTS

| | | |
|---|---|---|
| 1,240,043 | Gregory | Sept. 11, 1917 |
| 1,504,884 | Garst | Aug. 12, 1924 |
| 2,175,135 | Sorenson et al. | Oct. 3, 1939 |
| 2,385,415 | Jackson | Sept. 28, 1944 |
| 2,774,174 | Ganger | Dec. 18, 1956 |

FOREIGN PATENTS

| | | |
|---|---|---|
| 805,484 | France | Nov. 20, 1936 |
| 932,336 | France | Nov. 24, 1947 |